UNITED STATES PATENT OFFICE.

STANISLAU KALAMAIKOWSKI, OF NEW YORK, N. Y.

FIREPROOF CALCIMINE.

SPECIFICATION forming part of Letters Patent No. 603,693, dated May 10, 1898.

Application filed April 23, 1896. Renewed August 23, 1897. Serial No. 649,241. (No specimens.)

*To all whom it may concern:*

Be it known that I, STANISLAU KALAMAIKOWSKI, a citizen of the United States, residing in the city, county, and State of New York, have invented a new and useful Improvement in Fireproof Calcimine or Ivory Coating, of which the following is a specification.

My composition is designed for applying to walls, ceilings, buildings, or any object it is desired to coat with a simple, inexpensive, and fireproof coating; and it consists of the following ingredients combined in about the proportions specified: water, ten gallons; borax, four pounds; boracic acid, three pounds four ounces; sulfate of ammonia, four pounds five ounces; muriate of ammonia, four pounds five ounces; carbonate of lime, thirty-four pounds; oxid of zinc, five pounds; glue, five pounds five ounces; blue to color. In mixing these ingredients the water is used boiling hot and the ingredients dissolved therein in the order named, and when thoroughly mixed the calcimining or ivory coating is ready for application.

I have thus provided a simple cheap fireproof composition which gives the surface to which it is applied a fine finish and affords protection against any ordinary fire.

What I claim, and desire to secure by Letters Patent, is—

The herein-described composition to be used as calcimine or coating, consisting of water, borax, boracic acid, sulfate of ammonia, muriate of ammonia, carbonate of lime, oxid of zinc, and glue in about the proportions specified.

STANISLAU KALAMAIKOWSKI.

Witnesses:
 HENRY BUNO,
 LOUIS BERGER.